(12) United States Patent
Kilburn et al.

(10) Patent No.: US 11,870,747 B2
(45) Date of Patent: Jan. 9, 2024

(54) BLOCKCHAIN-DRIVEN CERTIFICATION OF ITERATIVE ELECTRONIC COMMUNICATIONS

(71) Applicant: Mitel Networks (International) Limited, London (GB)

(72) Inventors: Michael Kilburn, Bastrop, TX (US); Logendra Naidoo, Ottawa (CA)

(73) Assignee: Mitel Networks Corporation, Ontario (CA)

( * ) Notice: Subject to any disclaimer, the term of this patent is extended or adjusted under 35 U.S.C. 154(b) by 363 days.

(21) Appl. No.: 17/093,238

(22) Filed: Nov. 9, 2020

(65) Prior Publication Data

US 2022/0150202 A1     May 12, 2022

(51) Int. Cl.
| | | |
|---|---|---|
| *H04L 12/58* | (2006.01) | |
| *H04L 51/216* | (2022.01) | |
| *H04L 67/133* | (2022.01) | |
| *H04L 9/08* | (2006.01) | |
| *H04L 9/32* | (2006.01) | |

(Continued)

(52) U.S. Cl.
CPC .......... *H04L 51/216* (2022.05); *H04L 9/0825* (2013.01); *H04L 9/3236* (2013.01); *H04L 9/3247* (2013.01); *H04L 51/18* (2013.01); *H04L 67/133* (2022.05); *H04L 9/50* (2022.05)

(58) Field of Classification Search
CPC ... H04L 51/216; H04L 9/0825; H04L 9/3236; H04L 9/3247; H04L 51/18; H04L 67/133; H04L 9/50

See application file for complete search history.

(56) References Cited

U.S. PATENT DOCUMENTS 8,571,993 B2 * 10/2013 Kocher ................ G06Q 50/188
380/231
8,578,169 B2 * 11/2013 Adams .................. H04L 63/123
713/181

(Continued)

FOREIGN PATENT DOCUMENTS

| WO | WO2017027648 A1 | 2/2017 | |
|---|---|---|---|
| WO | WO-2020176975 A1 * | 9/2020 | ......... G06F 16/9024 |
| WO | WO 2020176975 A1 | 9/2020 | |

OTHER PUBLICATIONS

De, Nikhilesh, "Salesforce Wins Patent Trackling Email Spam With Blockchain", Website https://www.coindesk.com; Business; Nov. 7, 2018.

*Primary Examiner* — Jeffrey C Pwu
*Assistant Examiner* — Mayasa A. Shaawat (57) ABSTRACT

A communication system configured to provide blockchain-driven certification of iterative electronic communications such as e-mail-based communications. The system provides blockchain-driven certification by storing the hash of an e-mail thread in a blockchain each time the message or its elements are modified. This allows the system to verify whether or not the thread has been tampered with since it was last modified, when the last verified message was added to the thread. The system creates a baseline that is used towards creating trust certificates ensuring the recipients of such iterative electronic communications that the message has not been breached during its iterations that are shared between two or more parties, e.g., communications participants including senders and recipients.

20 Claims, 8 Drawing Sheets

(51) Int. Cl.
    *H04L 51/18*       (2022.01)
    *H04L 9/00*        (2022.01)

(56) References Cited

U.S. PATENT DOCUMENTS

| | | |
|---|---|---|
| 10,044,662 B1 | 8/2018 | Mesters et al. |
| 10,305,833 B1 | 5/2019 | Dennis |
| 10,574,453 B2 * | 2/2020 | Notani .................. H04L 9/0643 |
| 2005/0198511 A1 * | 9/2005 | Tomkow ............... H04L 63/123 |
| | | 713/176 |
| 2017/0134323 A1 * | 5/2017 | Alexander ............ H04L 51/216 |
| 2019/0349426 A1 * | 11/2019 | Smith ................. H04L 61/4505 |

* cited by examiner

FROM: ALICE@ACME.COM
TO: BOB@ACME.COM,CAROL@ACME.COM
DATE: THURSDAY, OCTOBER 8, 2020 AT 8:49 PM
SUBJECT: WATERING TREES

HI GUYS,

I HAVE A COUPLE OF QUESTIONS FROM A CUSTOMER REGARDING WATERING TREES. HOW DO YOU KNOW WHEN TO WATER?

THEY ALSO WANT TO KNOW HOW TO SAVE A TREE THAT HAS BEEN OVER WATERED.

THANKS,
ALICE

FIG.3

```
<!-- B1 -->
FROM: ALICE@ACME.COM
TO: BOB@ACME.COM,CAROL@ACME.COM
DATE: THURSDAY OCTOBER 8, 2020 AT 8:49 PM
SUBJECT: WATERING TREES

HI GUYS,

I HAVE A COUPLE OF QUESTIONS FROM A CUSTOMER REGARDING WATERING TREES. HOW DO YOU KNOW WHEN TO WATER?

THEY ALSO WANT TO KNOW HOW TO SAVE A TREE THAT HAS BEEN OVER WATERED.

THANKS,
ALICE
<!-- E1 -->

<!-- SIGS
{BLOCK:1,ID:ALICE@ACME.COM,HASH:1DD87BDF28E806D84497EFF89E43C9581CB42AE42FA4146F7B767811A88952
BF,SIG:A7B6459FF2218B048F96A4A27335E3095450C3CBBE90890D90932B1F20ED1264}
{XHASH:F67213B122A5D442D2B93BDA8CC45C564A70EC5D2A4E0E95BB585CF199869C98,DHASH:19ABB8EA2B95216
F55F50D52D174E1B59F3711097F29BCBD3807C6C7124E22D1 -->
```

FIG.4

```
FROM: BOB@ACME.COM
TO: ALICE@ACME.COM,CAROL@ACME.COM
DATE: THURSDAY, OCTOBER 8, 2020 AT 8:53 PM
SUBJECT: RE: WATERING TREES

HI ALICE,

YOUR CUSTOMER SHOULD BUY ONE OF OUR SOIL MOISTURE
METERS, THEY RANGE IN PRICE FROM $12 TO $200. IF YOU
ARE ON COMMISSION THEN THE $200 IS RECOMMENDED.
OTHERWISE THE $12 WORKS FINE. THEY ALL COME WITH
INSTRUCTIONS. I'LL LET CAROL ANSWER THE OVERWATERED
QUESTION.

BOB

<!-- B1 -->
FROM: ALICE@ACME.COM
TO: BOB@ACME.COM,CAROL@ACME.COM
DATE: THURSDAY, OCTOBER 8, 2020 AT 8:49 PM
SUBJECT: WATERING TREES

HI GUYS,

I HAVE A COUPLE OF QUESTIONS FROM A CUSTOMER REGARDING
WATERING TREES. HOW DO YOU KNOW WHEN TO
WATER?

THEY ALSO WANT TO KNOW HOW TO SAVE A TREE THAT HAS
BEEN OVER WATERED.

THANKS,
ALICE
<!-- E1 -->

<!-- SIGS
{BLOCK:1,ID:ALICE@AC
ME.COM,HASH:1DD87BDF28E806D84497EFF89E43C9581CB42AE42
FA4146F7B767811A88952BF,SIG:A7B6459FF2218B048F96A
4A27335E3095450C3CBBE90890D90932B1F20ED1264}
{X
HASH:F67213B122A5D442D2B93BDA8CC45C564A70EC5D2A4E0E95
BB585CF199869C98,DHASH:19ABB8EA2B95216F55F50D5
2D174E1B59F3711097F29BCBD3807C6C7124E22D1 -->
```

FIG.5

```
<!-- B2 -->                    ← 612
FROM: BOB@ACME.COM
TO: ALICE@ACME.COM,CAROL@ACME.COM
DATE: THURSDAY, OCTOBER 8, 2020 AT 8:53 PM
SUBJECT: RE: WATERING TREES

HI ALICE,

YOUR CUSTOMER SHOULD BUY ONE OF OUR SOIL MOISTURE
METERS. THEY RANGE IN PRICE FROM $12 TO $200. IF YOU ARE ON
COMMISSION THEN THE $200 IS RECOMMENDED. OTHERWISE THE
$12 WORKS FINE. THEY ALL COME WITH INSTRUCTIONS. I'LL LET
CAROL ANSWER THE OVERWATERED QUESTION.

BOB
<!-- E2 -->                    ← 614

<!-- B1 -->                    ← 412
FROM: ALICE@ACME.COM
TO: BOB@ACME.COM,CAROL@ACME.COM
DATE: THURSDAY, OCTOBER 8, 2020 AT 8:49 PM
SUBJECT: WATERING TREES

HI GUYS,

I HAVE A COUPLE OF QUESTIONS FROM A CUSTOMER REGARDING
WATERING TREES. HOW DO YOU KNOW WHEN TO WATER?

THEY ALSO WANT TO KNOW HOW TO SAVE A TREE THAT HAS BEEN
OVER WATERED.

THANKS,
ALICE
<!-- E1 -->                    ← 414

<!-- SIGS
{BLOCK:1,ID:ALICE@ACME.COM,HASH:1DD87BDF28E806D84497EFF8
9E43C9581CB42AE42FA4146F7B767811A88952BF,SIG:A7B6459FF2218B
048F96A4A27335E3095450C3CBBE90890D90932B1F20ED1264}
{BLOCK:2,ID:BOB@ACME.COM,HASH:DF8B4A92E2CA171DE363B8BA0
BE36C168CE4E08BF9D91ED7E03644409E0902CC,SIG:4E7808EACBA67
9A9D2EB8AB6EDA5417EE2060919C9EBF395B052CB8241E11BDB}
{XHASH:8EB5A5C4D7C544BD9662BF375D429C1F7D093C9A106F1FA31
93A47AF3D818750,DHASH:D129CE7254D00B38AE3C7F88A05B33225C
EABCEE756813363108490F281300D6 -->
```

710 {
FROM: CAROL@ACME.COM
TO: ALICE@ACME.COM,BOB@ACME.COM
DATE: THURSDAY, OCTOBER 8, 2020 AT 9:13 PM
SUBJECT: RE: WATERING TREES

SAVING AN OVERWATER TREE IS A DELICATE PROCESS AND IS GENERALLY NOT POSSIBLE, THEY WILL NEED TO REPLANT THE TREE AFTER CUTTING BACK ALL THE DEAD ROOTS.
}

510 {
<!-- B2 -->  ← 612
FROM: BOB@ACME.COM
TO: ALICE@ACME.COM,CAROL@ACME.COM
DATE: THURSDAY, OCTOBER 8, 2020 AT 8:53 PM
SUBJECT: RE: WATERING TREES

HI ALICE,

YOUR CUSTOMER SHOULD BUY ONE OF OUR SOIL MOISTURE METERS, THEY RANGE IN PRICE FROM $12 TO $200. IF YOU ARE ON COMMISSION THEN THE $200 IS RECOMMENDED. OTHERWISE THE $12 WORKS FINE. THEY ALL COME WITH INSTRUCTIONS. I'LL LET CAROL ANSWER THE OVERWATERED QUESTION.

BOB          ← 614
<!-- E2 -->
}

404 {
<!-- B1 -->  ← 412
FROM: ALICE@ACME.COM
TO: BOB@ACME.COM,CAROL@ACME.COM
DATE: THURSDAY, OCTOBER 8, 2020 AT 8:49 PM
SUBJECT: WATERING TREES

HI GUYS,

I HAVE A COUPLE OF QUESTIONS FROM A CUSTOMER REGARDING WATERING TREES. HOW DO YOU KNOW WHEN TO WATER?

THEY ALSO WANT TO KNOW HOW TO SAVE A TREE THAT HAS BEEN OVER WATERED.

THANKS,
ALICE
<!-- E1 -->  ← 414
}

610

<!-- SIGS
{BLOCK:1,ID:ALICE@ACME.COM,HASH:1DD87BDF28E806D84497EFF89E43C9581C
B42AE42FA4146F7B767811A88952BF,SIG:A7B6459FF2218B048F96A4A27335E30954
50C3CBBE90890D90932B1F20ED1264}
{BLOCK:2,ID:BOB@ACME.COM,HASH:DF8B4A92E2CA171DE363B8BA0BE36C168C
E4E08BF9D91ED7E03644409E0902CC,SIG:4E7808EACBA679A9D2EB8AB6EDA5417
EE2060919C9EBF395B052CB8241E11BDB}
{XHASH:8EB5A5C4D7C544BD9662BF375D429C1F7D093C9A106F1FA3193A47AF3D
818750,DHASH:D129CE7254D00B38AE3C7F88A05B33225CEABCEE7568133631084
90F281300D6 -->

```
<!-- B3 -->                    812
FROM: CAROL@ACME.COM
TO: ALICE@ACME.COM,BOB@ACME.COM
DATE: THURSDAY, OCTOBER 8, 2020 AT 9:13 PM
SUBJECT: RE: WATERING TREES

SAVING AN OVERWATER TREE IS A DELICATE PROCESS AND IS GENERALLY NOT
POSSIBLE, THEY WILL NEED TO REPLANT THE TREE AFTER CUTTING BACK ALL
THE DEAD ROOTS.
<!-- E3 -->         814

<!-- B2 -->         612
FROM: BOB@ACME.COM
TO: ALICE@ACME.COM,CAROL@ACME.COM
DATE: THURSDAY, OCTOBER 8, 2020 AT 8:53 PM
SUBJECT: RE: WATERING TREES

HI ALICE,

YOUR CUSTOMER SHOULD BUY ONE OF OUR SOIL MOISTURE METERS, THEY
RANGE IN PRICE FROM $12 TO $200. IF YOU ARE ON COMMISSION THEN THE
$200 IS RECOMMENDED. OTHERWISE THE $12 WORKS FINE. THEY ALL COME
WITH INSTRUCTIONS. I'LL LET CAROL ANSWER THE OVERWATERED QUESTION.

BOB
<!-- E2 -->         614

<!-- B1 -->         412
FROM: ALICE@ACME.COM
TO: BOB@ACME.COM,CAROL@ACME.COM
DATE: THURSDAY, OCTOBER 8, 2020 AT 8:49 PM
SUBJECT: WATERING TREES

HI GUYS,

I HAVE A COUPLE OF QUESTIONS FROM A CUSTOMER REGARDING WATERING
TREES. HOW DO YOU KNOW WHEN TO WATER?

THEY ALSO WANT TO KNOW HOW TO SAVE A TREE THAT HAS BEEN OVER
WATERED.

THANKS,
ALICE
<!-- E1 -->         414

<!-- SIGS
{BLOCK:1,ID:ALICE@ACME.COM,HASH:1DD87BDF28E806D84497EFF89E43C9581C
B42AE42FA4146F7B767811A88952BF,SIG:A7B6459FF2218B048F96A4A27335E30954
50C3CBBE90890D90932B1F20ED1264}
{BLOCK:2,ID:BOB@ACME.COM,HASH:DF8B4A92E2CA171DE363B8BA0BE36C168C
E4E08BF9D91ED7E03644409E0902CC,SIG:4E7808EACBA679A9D2EB8AB6EDA5417
EE2060919C9EBF395B052CB8241E11BDB}
{BLOCK:3,ID:CAROL@ACME.COM,HASH:E8622750122D5E85637296354CE7527C05
4B37F47A794DAE8E5170CD3ADF16DC,SIG:82976CAE6E6B7716BA109C6BC939314
2C58E0A0C49D8431B62C36B29E80CD5CF}
{XHASH:C8EA96BB6358ED82BBF2CDD1AFAF87877BEF0BE83C6E061281D1F80954
467EB3,DHASH:0A75FCE8765B4A0046E4FEB12280345A1B94D7D7F3A68BF41F792
EFCE35A5B58 -->
```

FIG.8

BLOCKCHAIN-DRIVEN CERTIFICATION OF ITERATIVE ELECTRONIC COMMUNICATIONS

FIELD OF THE INVENTION

The present disclosure generally relates to electronic communication methods and systems including those utilizing the Internet and cloud-based solutions. More particularly, examples of the disclosure relate to electronic communication methods and systems that can provide certification of threads or chains of electronic communication, such as e-mail message streams among two-to-many participants, are authentic and have not been modified from those originally sent by the participants.

BACKGROUND OF THE DISCLOSURE

Mobile and web applications allow users, such as operators of smartphones and other portable computing devices as well as tablets, laptop, notebook, and desktop computers, to perform a wide range of communication functions. Of course, one continuing use of smartphones and portable computing devices (together "client devices") is to communicate quickly and efficiently using electronic mail or communications (i.e., "e-mails" or "email messages"). Recently, there has been a growing demand for verification that these e-mail messages have not been modified by the participants (accidentally or intentionally) or by third parties (such as part of a phishing campaign or for other reasons). In part, this demand is due to the fact that electronic messages have become knowledge assets of the participants and the companies or organizations to which they belong.

There are many instances where use of electronic communications results in a complicated thread of messages, and the messages or e-mails may follow a nonlinear, complex messaging structure that may include use of embedded comments. For example, when participants in the communications respond to an e-mail and input their comments in-line, it often results in a long e-mail thread that is hard to read as each contributor's or participant's comments are sprinkled throughout the thread. More recently, such iterative messaging has begun to rely on the embedding of annotated content in response to another message within an inferred hierarchy. The message thread itself becomes a knowledge-based asset that requires protection similar to version control. If the e-mail thread is ever taken out of its chain-of-custody, the hierarchy is lost or the potential increases for an author's contribution to be compromised. As a result, certification is critical to build trust amongst the message's recipients, but, to date, such certification has been difficult to provide.

In addition to certifications of authenticity, there is a growing demand to maintain security while using electronic communications. One of the most common forms of phishing is the unsuspecting, mass-mailer type in which a fake co-worker sends out an e-mail pretending to be a real co-worker. Such phishing attempts tries to trick the recipient into taking some action such as clicking on a link provided in the e-mail message or thread or requesting the recipient to log into an account website, and these actions often result in the downloading of malware onto the recipient's client device. To this day, most phishing attacks rely on e-mail spoofing in which the e-mail header (e.g., the "From" field) is forged to make the message appear as if it was sent by a trusted sender. Most phishing campaigns are predicated on the intrusion perpetrated through an unsuspecting e-mail that is carefully based on the guise of the trustworthiness of one e-mail appearing in your electronic communications inbox.

Beyond security considerations, emphasizing trust in electronic communications is material to customer interactions with companies as is the protection of financial-related electronic communications. Also, all corporate communications, whether it be formal or informal e-mail messaging, is intellectual property, and, therefore, an asset that is important to the growth and success of each corporation. This is one reason many companies that support or provide electronic communications offer advanced security for journalists, activists, business leaders, and political campaign teams because such major communication platforms must rely on external communications to share and grow knowledge while simultaneously protecting themselves from cyber intrusion.

To date, efforts to certify electronic communications have not met the demands for security and for certification of authenticity (or for lack of modifications). Editors of iterative electronic communications may parse the messages so that manual formatting is applied that divide up discussions to make it easier to seen when an in-line comment starts. Furthermore, some e-mail editors automatically distinguish between an original conversation and a comment inserted afterwards. Also, some messaging utilities prevent the editing of past content altogether. However, there remain problems when the source in a message gets compromised and when the attribution of the originator's messages become discombobulated. Existing technologies also can lose control of annotations so that they cannot be attributed to the correct person, which can be problematic when the annotation is as important as the original message or more so.

The problems with certification and security may primarily exist in electronic communications whenever an element is replied to or forwarded (e.g., within a message thread or chain). Additionally, an e-mail may be leaked outside an organization or group of intended participants and then carefully counterfeited to give the appearance it is to or from a customer (or known participant in the thread) and/or to ask the recipient to infiltrate their security, both of which can result in unintended consequences including money being withdrawn or transferred.

Any discussion of problems provided in this section has been included in this disclosure solely for the purposes of providing a background for the present invention and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

FIGS. 3-8 illustrate a series of e-mail messages (iterative electronic communications) during creation, blockchain-driven certification, and transmission/receipt during operation of a system of the present description (such as the system of FIG. 1 to perform the method of FIG. 2).

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems, and corresponding methods performed by such systems, that can, for example, provide blockchain-driven certification of iterative electronic communications such as those involving a thread or chain of e-mails or e-mail messages. Such threads or chains are often created using forward and reply functions of most electronic mail services.

The new system (and associated method) involves storing the hash of an e-mail thread in a blockchain each time the message or its elements are modified. This allows the system to verify whether or not the thread has been tampered with since it was last modified (when the last verified message was added to the thread). The system creates a baseline that is used towards creating trust certificates ensuring the recipients of such iterative electronic communications that the message has not been breached during its iterations that are shared between two or more parties (e.g., communications participants including senders and recipients). Furthermore, in the case of extremely sensitive information (e.g., stealth startup discussions, confidential projects, and the like), it is impossible to preserve the chain-of-custody of the message thread if a member of the team unlinks from the blockchain (which indicates the thread cannot be trusted), and the system requires the thread of the messaging be delivered as a whole to maintain trust.

The examples provided herein stress use of the system to certify e-mail communications (e.g., communications services via e-mail utilities), but it will be understood that the techniques are readily extended to standard CC chat sessions and/or social media forums such as where context is used to form part of a new composition. Hence, the term "electronic communications" is intended to encompass these other iterative-type communications and not to be limited to e-mails and e-mail threads.

In creating the new certification method for electronic communications, the inventors recognized that, while most businesses promote cross-team collaboration, there exists many challenges around effective teamwork. All departments and their employees rely on specific communication tools (e.g., Salesforce, Zendesk, Github, Jira, and the like), which can potentially isolate themselves from their colleagues. This is one of the reasons that e-mail is still the universal standard for electronic communications in the workplace and similar environments. Hence, as long as programs for electronic communications (such as e-mails) allow for the insertion of comments, the communications system must allow the embedding of subsequently authored content. E-mails are more desirable in many cases than messaging services that block use of prior messages in part specifically because they offer a versatile canvas for new contributors to exemplify a past message as the basis for of a new message.

The new system was designed on the idea that a blockchain makes electronic communiques in a series (or iterative electronic communications), such as e-mails in a chain or thread, less prone to tampering. If a member/participant of that electronic communications chain is governed by a digital contract (which may be tracked by the new system), editing an e-mail outside of that set of agreements is then treated as a rogue element that is unauthorized by its contributors, which may be indicated by the lack of a digital trust certificate being provided by the system. If the message or chain is verified by the system, the system may cause the e-mail utility to provide an indication of trust such as a green light or other icon with or without a message (e.g., "This electronic communication has been verified by XYZ Blockchain Certifier" or the like).

The system may be configured to prevent or control the sending or distribution of such previously certified content if it is taken out of its intended context such as with a warning message and/or icon (e.g., a red stop sign symbol alone, a text message alone (such as "Suspected Breach" or "Unauthorized Distribution Detected"), or a combination thereof) as a pop up in the sender's e-mail utility on their client device and/or in the receiver's e-mail utility on their client device. For example, if a person edits an inline comment or deletes it, the last e-mail in that thread reflects input that was not originally provided. With the new communications system taught herein, the system may be configured to not allow the tampering to begin with (e.g., to edit requires breaking the chain) or it may be configured to prevent the distribution of such content depending on how the method is applied (e.g., application rules of user friendliness may apply).

The severity of the problem being addressed by the new communications system can be made evident by using the example of when a stock trader is accused of inside trading. The trader deletes e-mails in their inbox in order to leave no trail of evidence except the forged printed copies. In such a case, with the new certification method implemented, even the printing of an e-mail can be governed by a security policy and the blockchain would include the ledger that records the point at which the e-mails were taken out of the chain-of-custody, thereby providing proof of the point when tampering occurred by the inside trader.

As another useful example, a customer may respond to a CC agent but are missing the support agent's original point because the exhaustive annotations have resulted in a very complex communications thread. Parsing a message is not helpful because it still requires the reader to read the complex message to ensure the original thread is intact or that the annotations have resulted in a compromised thread. An example would be when an excerpt of the message summarizing interactions is provided but is missing a key passage for it to make sense. The new communications system elevates iterative communications to become more precise as far as establishing a trust-based baseline, whether it concerns customer communications or internal office communications. Therefore, the blockchain-based certification of the new system ensures critical context that is paraphrased is not lost, and it applies the principle of continuity that is not revisionist or subjective.

The new method to securing electronic messaging threads ensures the contributions of each author/participant are not tampered with across one-to-many iterative communication events (e.g., platform-based e-mails, support forums, Salesforce or other messaging, and the like). Phishing campaigns often dupe unsuspecting e-mail recipients into thinking they are responding to a message that is from an authentic originator when in fact the message is an unauthorized copy taken out of context (out of a chain/thread) for the purposes of committing a crime (e.g., "SUBJECT: Re Topic of Interest"; BODY: "BTW, before we meet, can you please send me your username & password in separate e-mails for security purposes? Thanks.").

At other times, a person's original e-mail, their response, or their annotations may be inadvertently (or intentionally) compromised. In such cases, a mischaracterization of a person's intended contribution or their opinion has been made resulting from an alteration (e.g., punctuation, deleted segments, additional words not properly annotated (e.g., with a person's initials) or the like). Furthermore, e-mail utilities often encrypt e-mails end-to-end for the purpose of securing communications, but these utilities do not look at the content of the messages, which can be decrypted, tampered with, and re-encrypted. This means contributions (e.g., direct reply or annotations by an author) within an e-mail thread can be spoiled while standard encryption does not solve the problem of a broken chain-of-custody.

The ordinary sequence of custody, control, transfer, analysis, and disposition of iterative communications can be secured using the blockchain-driven method described herein, which does not rely solely on the principle of encryption, but, instead, makes use of smart or digital contracts that govern individual components of an e-mail (original message, response, and/or annotation). The method represents a blockchain-based security apparatus that first integrates with a standard e-mail utility or program (e.g., via an API or the like). The security apparatus creates a message wrapper (such as dApp shown in accompanying figures) from the sender and identifies the "signer," which then creates a trust basis using the last known recipient to form a digital contract. The digital contract includes a hashing process that validates the original message by identifying the bounds of the incremental portion of the message being added to distinguish the original message from the annotation(s) (e.g., $Sig_s$ and $Pub_c$, in following discussion). The hash, once created, only corresponds to the last signed message; therefore, new contributions are stored with the message and then the hash is updated accordingly. A validation process ensures the deltas (e.g., annotations to prior message) are only being "hashed" and that bounds of the message are defined (e.g., new text is outside the existing paragraph or sentence).

Figure 1:
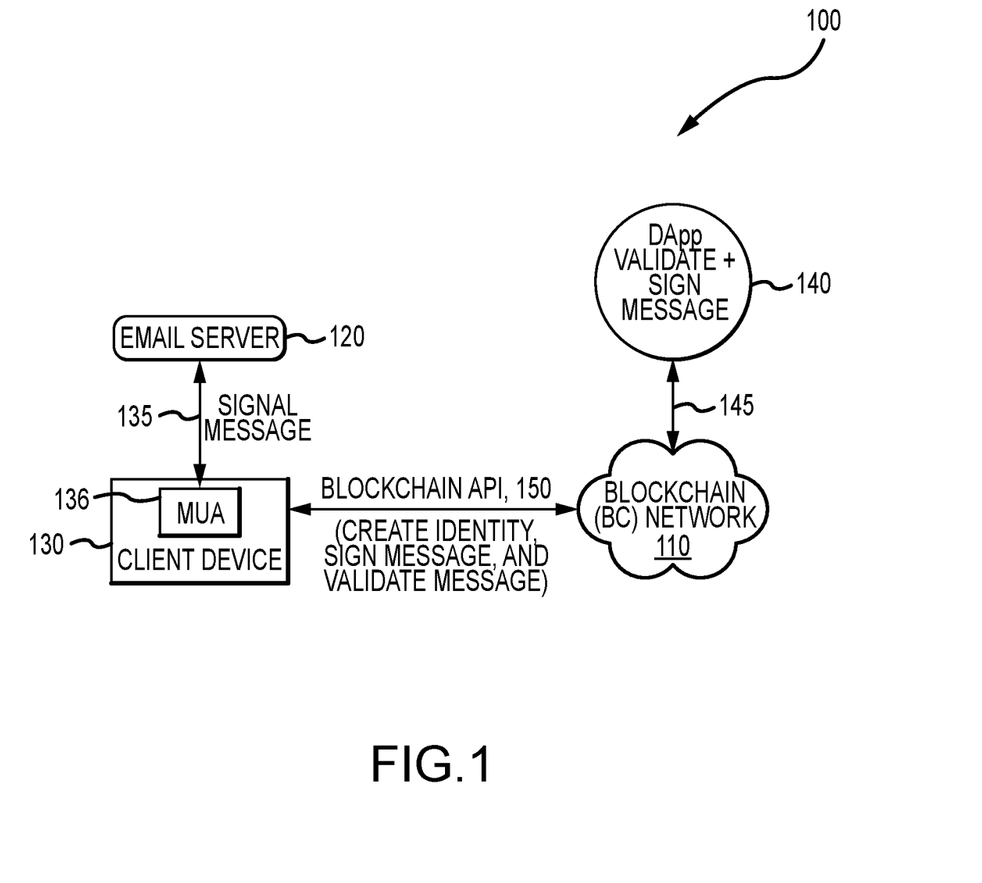
FIG. 1 illustrates an electronic, cloud-based communication system adapted to provide blockchain-driven certification of iterative electronic communications in accordance with exemplary embodiments of the disclosure.

FIG. 1 illustrates a communications system adapted according to the present description to provide blockchain-drive certification of iterative electronic communications (such as, but not limited to, e-mails within a chain or thread). As shown, the system 100 includes a blockchain-(BC) network 110 communicatively coupled with a client device 130 and, more specifically, with the MUA 136 (Mail User Agent or utility) running on such device 130 via a blockchain API 150. The BC network 110 is also communicatively coupled with a distributed application ("dApp") 140 as shown with arrows 145 (or the dApp 140 may be thought of as running in the blockchain network 110). The client device's MUA 136 is coupled with an e-mail server 120 as shown with arrows 135.

Briefly, a user's MUA (Mail User Agent or utility) 136 uses a plugin that leverages the blockchain API 150 to submit transactions containing the e-mail message text. These transactions trigger a distributed application 140 that runs on behalf of the sender to validate and sign the message. The API 150 returns the signed message to the MUA 136, which can then send them as shown with arrows 135 to the e-mail server (e.g., Exchange or the like) 120. When a user receives a signed message 135 via operation of a client device 130 (one shown but system 100 would typically include numerous client devices 130), the MUA plugin 136 uses the blockchain API 150 to validate the message.

Blockchain (i.e., the BC network 110) is used in the system 100, in part, because blockchain is made up of a time-stamped series of abiding records of data that are managed by a distributed cluster of computers (not centrally governed by any single server entity). Each block of data is encrypted and digitally contracted to one other using cryptographic principles (i.e., the chain). With the MUA 136, the blockchain-drive system 100 provides a solution that offers a way to organize threaded content according to transactional purpose. If a user sends a message to another user within the same thread, the system 100 identifies the individual contributions and then applies a hashing process to encapsulate the discrete message of each contributor in the blockchain. When a new message is received, a subroutine/process ("diff process") is applied to validate what the original message had in it and to identify the sender's contributions.

Client device 130 can be or can include any suitable device with wired or wireless communication features that can connect to network 110 and e-mail server. For example, device 130 can include a wearable device, a tablet computer, a wired phone, a mobile phone, a personal (e.g., laptop or desktop) computer, a streaming device, such as a game console or other media streaming device, or the like.

The MUA 136 is the component of an e-mail system within the system 100 that interfaces with the user (or operator of client device 130). For example, the MUA 136 may take the form of the Gmail Web client or Outlook Web/Desktop client. Conventional MUAs have a plugin type of interface that allows third parties to add their own features, with UC conferencing systems being a common example. In the system 100, a plugin is used to cause the MUA to provide the features described herein including, significantly, executing the blockchain API(s) 150.

The blockchain APIs 150 are used to perform several functions within the system 100. First, the blockchain APIs 150 create an identity. Each user (operator of a client device 130) creates an account on the blockchain (e.g., in network 110) by generating a public/private key pair and associating the public key with their e-mail address. The public key/e-mail address association is stored on the blockchain (e.g., in network 110). The private key is kept secure by the user such as by storing in the operating system (OS) secure store accessible with or on device 130 using a key derivation function (KDF) or the like. Subsequent API calls are authorized by challenging the user to provide they own the private key of the e-mail address used in the API call. Second, the blockchain APIs 150 store the dApp 140. The dApp 140 is initially downloaded to the blockchain (in or accessible to network 110) and associated with the user. Third, the blockchain APIs 150 submit transactions and run the dApp 140, and transactions are used to trigger the dApp 140.

The blockchain distributed application or dApp 140 acts to validate and sign messages created via the MUA 136 with client device 130 in system 100. Code can be stored on the blockchain network 110 and run on behalf of the creator. In the system 100, this code is referred to as dApp 140. This code that runs on the blockchain network 110 can also be referred to as Chaincode or a Smart Contract. There are many different blockchain implementations with varying features and capabilities. Depending on those capabilities, the specific details on where certain steps/functions are executed (e.g., the plugin for MUA 136, the blockchain API 150, and the dApp 140), and the use of off-chain data storage may vary to implement the system 100. In this non-limiting example, the dApp 140 does all validation and signing of iterative electronic communications, with no off-chain storage being used.

During operation of the system 100, the user's MUA 136 has a plugin that uses the blockchain API 150 to submit the transactions containing the electronic message (e.g., e-mail) as payload. These transactions trigger the distributed application 140 that runs on behalf of the sender to validate and sign the message. The blockchain API 150 returns the modified and signed message to the MUA 136, which can then send the signed (and certified) message as shown with arrows 135 to the e-mail server 120 for transmission to a recipient (such as another operator of a client device 130 with a MUA 136 with a plugin as discussed herein). When a user receives a signed message (as shown with arrows 135), the plugin of the MUA 136 uses the blockchain API 150 to validate the message using the dApp 140. The blockchain API 150 validates a user's identity when transactions are submitted.

At this point in the description, it may be useful to explain operations of a certification system (such as system 100 of FIG. 1) during a validate and sign process (i.e., explain the algorithms and techniques used by a system to certify messages using blockchain). As a first step, the system supports a primary user creating an e-mail for one or more recipients. Next, the user, in MUA, executes the send command. In response, a client-specific blockchain API plugin is executed. As a next step, the system performs a validation of the original content contained within the e-mail message. The API plugin creates a new blockchain transaction that triggers the Smart Contract (or distributed application), and, next, the e-mail is sent.

The validate and sign process continues with recipients receiving the message, and, in response, the recipient's blockchain API plugin performs another validation (e.g., "tampered with or not?"). As a next step in the process, a data comparison tool (e.g., part of the dApp or another application provided in the system), such as a standard diff process, detects changes in the message. The Smart Contract/dApp applies heuristic rules on the validated content that prevents unauthorized changes to the content. As a next step in the process, the introduction of new content by the e-mail recipient (resulting from the data comparison tool) leads to a recalculation of the hash. The process continues with the transaction being completed, and the validated message stored in the blockchain being returned to the client device's MUA. In some cases, an identifier (icon, message, or combination thereof) of the security status is created to certify (e.g., a green button/light) or to decertify (e.g., a red stop sign symbol or light) the message. As part of the process, the system stores the e-mail message that is replete with the hashing annotations, e.g., in the e-mail server 120 of FIG. 1. The process continues by repeating the process with the next e-mail being sent.

With the general validation and signing process understood, it may be useful to discuss more specifically the anti-tampering algorithm or schema implemented by the systems of the present description using blockchain techniques. First, additions of text to a communications thread follow the basic formatting rules: (a) new text must start and end outside of existing protected blocks of text; and (b) blocks of text cannot be reordered. Second, a block can be a continuous set of characters that are separated by a blank line or an individual line can also be a block. Third, new text is always protected by a signed hash of each block of text. The combination of the signed hash, the user identity, and the block number is appended to the bottom of the message construct generated by the system. Fourth, start block and end block markers with a block number are placed at the start and end of the hash protected block. Fifth, when new blocks are added between blocks, the numbering will be nested so that order can always be protected and verified.

Figure 2:
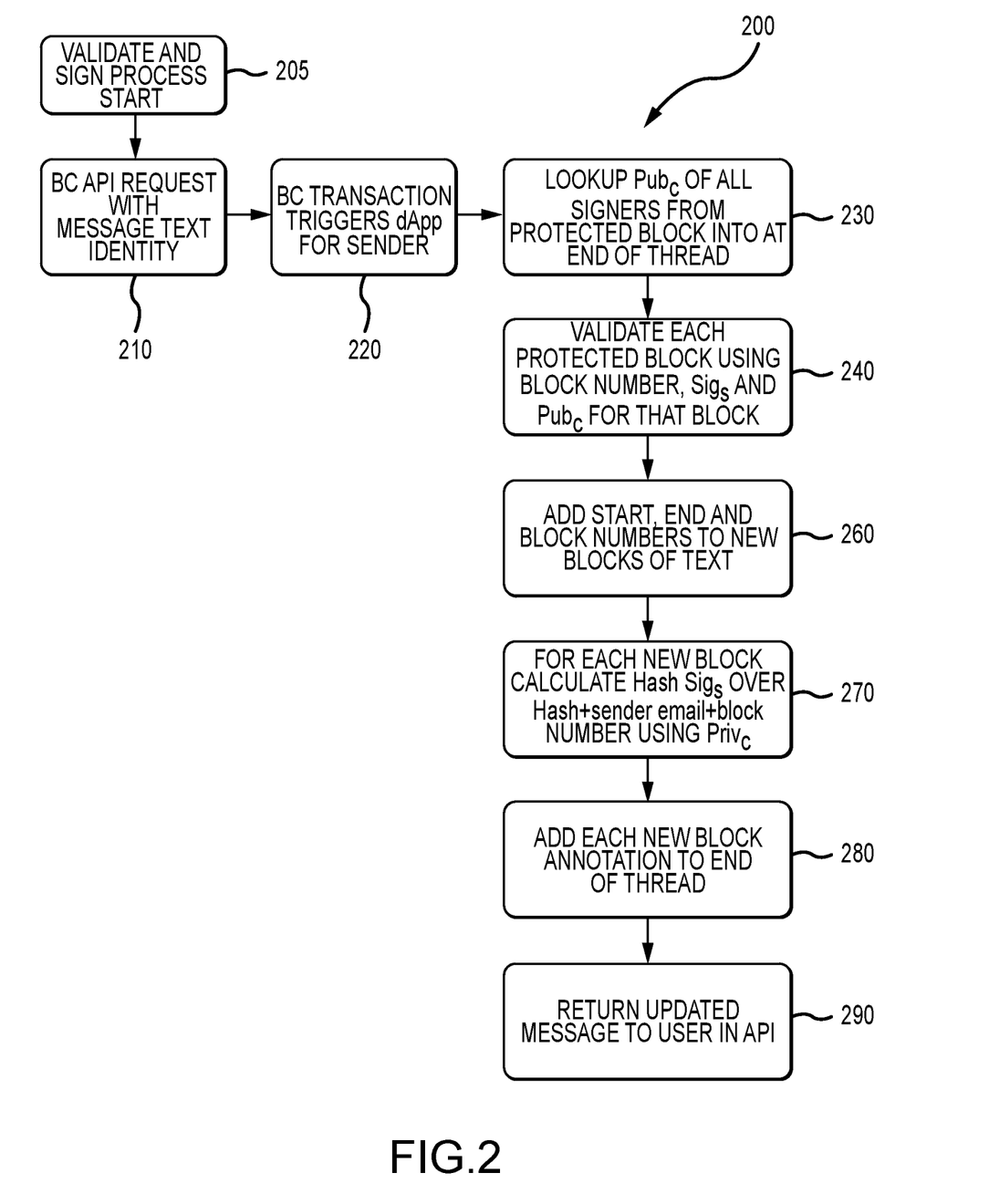
FIG. 2 is a flow diagram of a blockchain-driven process for providing certification of iterative electronic communications.

FIG. 2 is a flow diagram of a blockchain-driven process 200 for providing certification of iterative electronic communications (e.g., e-mail communications and the like). The method 200 starts at 205 such as with providing a blockchain plugin for each MUA in client devices participating in a set of communications and with each establishing a validation and signing account (as discussed above with reference to FIG. 1). The method 200 continues at 210 with generating a blockchain API request that includes the message text and the user's identity. At step 220, the blockchain transaction triggers the distributed application (e.g., dApp 140 in FIG. 1) for the sender.

Then, at step 230, the distributed application acts to lookup the public key, $Pub_c$, of all signers of the message from the protected block information at the end of the communications (e.g., e-mail) thread, with the public key being the Curve25519 public key in some implementations. The public key is typically in the identity transaction for the e-mail address. The method 200 continues at 240 with the distributed application validating each protected block using the block number, the public key, $Pub_c$, and signature, $Sig_s$, for that block. Each "protected block" is a block of text with start and end markers and block number where the block number references an annotation at the end of the thread. The signature may be equal, in some implementations, to Ed25519 calculated over hash+e-mail+block number using the converted private key, $Priv_S$ (which may be the Curve25519 private key). The protected block contains start and end markers as well as the block number. Protected block information at the end of the thread contains a list of annotations for each block, with an "annotation" being a section of text added to the message containing block number, the signer's e-mail address, the hash, and the signature, $Sig_s$.

The method 200 continues at 260 with adding the start marker, the end marker, and the block numbers to new blocks of text. Then, at 270, for each new block, the hash and signature, $Sig_s$, are calculated over the hash+sender e-mail+block number using the private key, $Priv_s$. Typically, the user's private key is part of the distributed application. Next, the method 200 continues at 280 with adding each new block annotation to the end of the thread and, at 290, with returning the updated message to the user's MUA via the blockchain API.

As will be understood from the above descriptions of the new system and associated methods, the blockchain (or blockchain network) transactions including: (a) creating an identity for each user; (b) verifying identities; (c) creating conversations; and (d) adding conversation. The blockchain API acts to: (a) submit each transaction; (b) verify conversations; and (c) perform a data comparison (or diff) process on messages. Each contribution by a participant in the communications in text format is contained in a block, which is annotated with a hash of enclosed text, with the identity of the smart contract (SC) (or dApp) that signed the block, and a digital signature of the annotation.

When a message is submitted to the blockchain, the SC/dApp of the sender validates and updates the signature. The hash is used to store a copy of the message off chain. The submitting blockchain API returns the signed message to the user, whose MUA then sends it to their e-mail server. With regard to the reply and validation of message updates, the SC/dApp uses the hash contained in the outer annotation to retrieve the last validated version of the message. The SC/dApp performs a data comparison process of the submitted text and last version. The SC/dApp verifies that new text is added after at least one new line and that existing text is not modified. The transaction fails if validation fails. The new content is annotated and signed by the SC/dApp of the user that added the text.

To create a user identity and distributed application (dApp) instance, the MUA creates a key set and calls the blockchain API. The blockchain network challenges the MUA with public key encrypted token to the e-mail. The MUA response by submitting an unencrypted token to the blockchain API. The MUA compiles and uploads the dApp containing the private key in a non-public data section of dApp memory space.

The annotations provided by the system on certified or validated messages may take a variety of forms to practice the present invention. For example, the annotation provided at the end of the message thread may take the form of:

@validated=john.doe@gmail.com
AE61266750D019063512516C7EE01968012C81F25A896A38517DCD5A7E99FE26
CB61266760D019063512516C7EE01968012C81F25A896A38517DCD5A7E99FZ32

Or, as another example, the annotated message may appear as:

MSG SIG john.doe@gmail.com
AE61266750D019063512516C7EE01968012C81F25A896A38517DCD5A7E99FE26
CB61266760D019063512516C7EE01968012C81F25A896A38517DCD5A7E99FZ32
e-mail thread text
MSG END Turning now to message structure and handling by the distributed application or dApp, a signature section containing data to protect additions to the message is added to the end of the message. The data is a list of IDs, hashes, and digital signatures for blocks of text contained in the message. The blockchain transaction ID and hash of the whole message is also included. The dApp first validates all existing blocks. New text blocks are then identified and protection data is added to the signature section. The whole message hash data is then updated.

Shown in FIG. 3 and later figures is an example verification or certification process for an e-mail message (or e-mail thread or chain). This simple implementation provides all the new text (added to the conversation or iterative communications by a user) is placed in a single block. Note, this prevents users from adding reply text between paragraphs. In a more complex implementation, each paragraph of a user's added text would be a separate block, and block numbering would be nested to prevent reordering. Another alternative implementation may provide start/end char/line positions are used in the signature section rather than block markers. Note also, the MUA could hide the block markers when displaying the conversation to the user on their client device. In some cases, the message signed block-based system is configured to require no storage of the message itself as users are limited to adding new text outside existing block markers.

Figure 3:
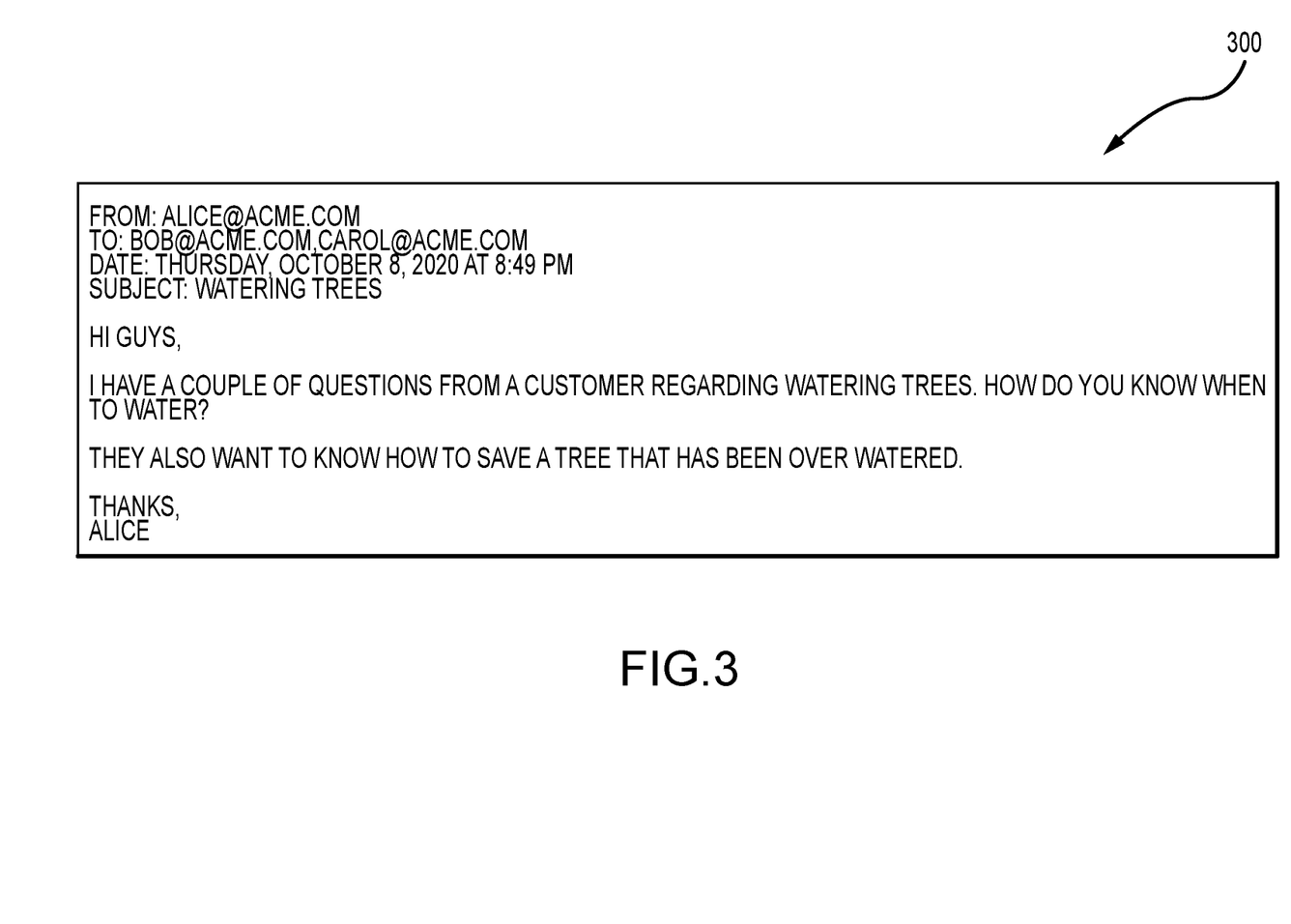

FIGS. 3-8 illustrate a series of e-mail messages (iterative electronic communications) during creation, blockchain-driven certification, and transmission/receipt during operation of a system of the present description (such as the system of FIG. 1 to perform the method of FIG. 2). FIG. 3 illustrates an exemplary e-mail message 300 as may be generated using a MUA with a plugin of the present description, and the MUA may operate to display this message on a display screen of a user's client device (e.g., a client device of a user having an account in the blockchain-driven certification system). This first e-mail 300 is sent from the user to the blockchain API for processing by the distributed application or dApp as discussed above.

Figure 4:
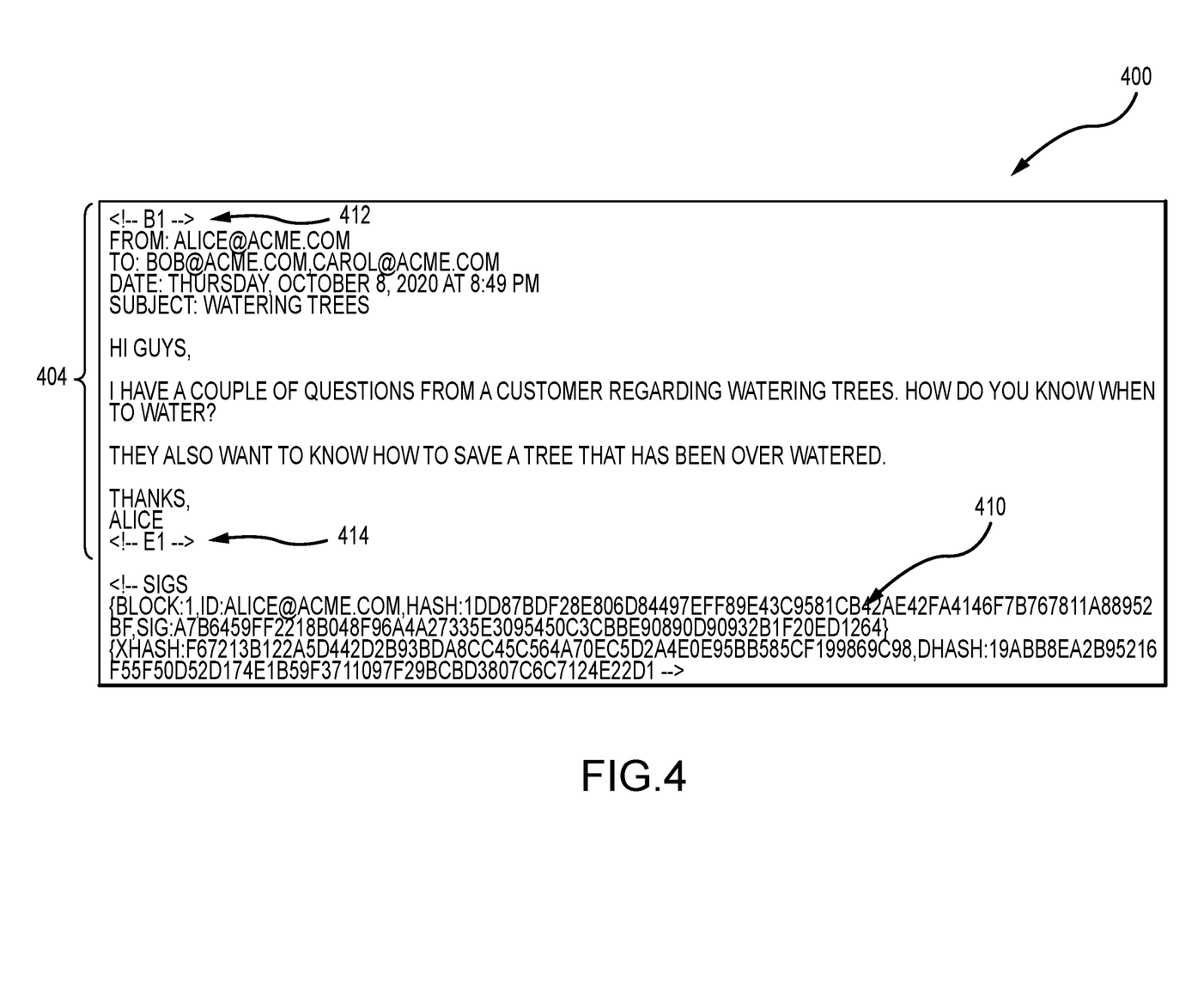

FIG. 4 illustrates the message 400 that is returned from the dApp and sent to the e-mail server for transmission to the recipients. The message 400 is what the recipients receive and what may be displayed by their MUA in a display of their client device. As shown, the message 400 includes the text generated by the first sender (here "Alice"). The dApp has bound this in a block, which is marked in the message 400 with a start or begin position marker 412 and an end position marker 414. Further, the message 400 includes a signature section that includes the contents as discussed above including the block number, the user's ID, the block's hash, and the blockchain signature.

Figure 5:
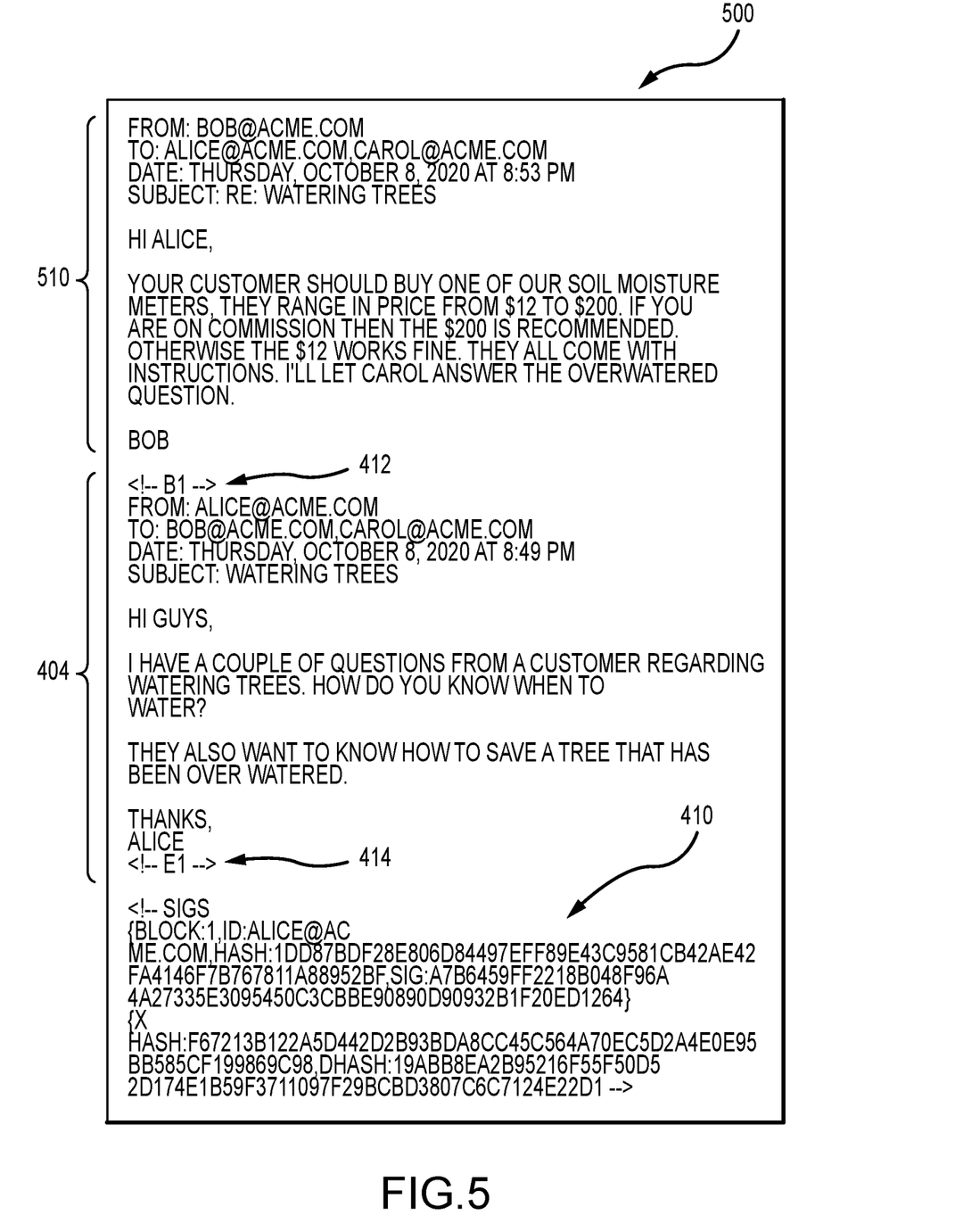
Figure 6:
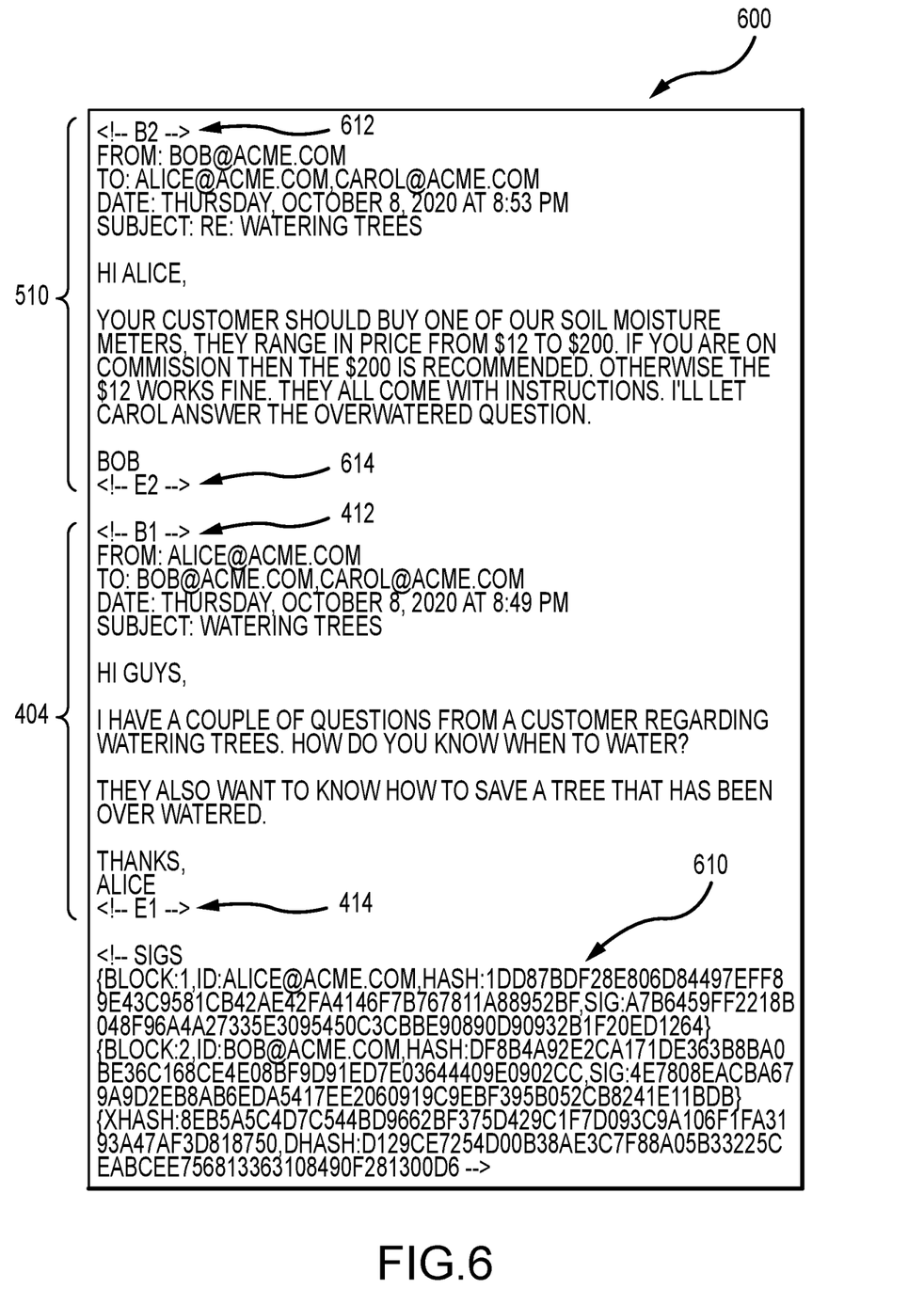

FIG. 5 illustrates a reply message 500 generated by one of the two recipients of the original message 400 that is sent to the distributed application or dApp for processing. As shown, the message 500 includes a block of added text 510 from the second sender/author (here "Bob") along with the original block of text 404 marked by markers 412 and 414 and with the original signature section 410. FIG. 6 illustrates a certified version 600 of the reply message 500 that is returned from dApp and sent to the e-mail server serving this second sender's client device and its MUA. This is the message that the recipients participating in this iterative electronic communications will receive via their MUAs and will be displayed on their client devices when accessed. The message 600 includes the original block 404 delineated by markers 412 and 414 with the added text in block 510 above it and delineated by begin and end markers 612 and 614. The dApp provides a modified signature section that includes portions of the original signature section 410 and adds similar information for the new block (or Block 2) including the author's ID, a hash of the new block, and a blockchain signature.

FIG. 7 illustrates a response message 700 to the message 600 of FIG. 6. This reply is sent to dApp for processing, and it includes the blocks 404 and 510 with their markers 412, 414, 612, and 614 as well as the original message blocks 404 and 510. The message 700 also includes the signature section 610 previously created by the dApp for this message thread. Additionally, the message 700 includes text 710 added by this third author or sender (here "Carol"). FIG. 8 illustrates the certified replay message 800 returned from dApp and sent to the e-mail server by this sender's MUA, and this is the form of message that would be sent to the recipients for display on their client devices. As shown, the message 800 includes the original message blocks 404 and 510 with begin and end markers 412, 414, 612, and 614 in their proper sequence below the newly added message block 710 that is not identified with begin marker 812 and end marker 814. Further, the message 800 includes updated signature section 810 that includes the prior signature information along with information for the new block 710 including the added block number, the author's ID, the added block's hash, and the blockchain signature.

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

We claim:

1. An electronic communication system adapted for certification of iterative electronic communications comprising:
   a blockchain network;
   a first distributed application coupled to the blockchain network;
   a second distributed application coupled to the blockchain network;
   a first client device associated with a first user and having a first mail user agent (MAU) and a first application programming interface (API), wherein the first client device is in communication with the blockchain network and the first distributed application;
   a second client device associated with a second user and having a second MAU and a second API, wherein the second client device is in communication with the blockchain network and the second distributed application;
   an email server in communication with the MAU of the first client device and the MAU of the second client device;
   wherein the first distributed application is configured to (a) store a first blockchain key associated with the first user (b) receive a first e-mail message from the first client device, wherein the first email message includes an annotation by an email author in the email thread and, in response, create a first certified version of the first e-mail message by generating a first hash and a first signature by the blockchain network based on the first blockchain key, and (c) transmit the first certified version of the first e-mail message with a signature portion including the hash, the annotation and the signature to the first client device for further transmission; and
   wherein the second distributed application is configured to (a) store a second blockchain key associated the second user, (b) receive a second e-mail message from the second client device, wherein the second email message includes additional text not included in the certified version of the first email message and also includes a second annotation by an email author in the email thread, (c) create a second certified version of the second e-mail message by generating a second hash of the additional text, the second annotation and a second signature by the blockchain network based on the second blockchain key, and (c) transmit the second certified version of the second email message with a modified signature portion that includes the second hash of the additional text and the second signature to the second client device for further transmission.

2. The electronic communication system of claim 1, wherein the second distributed application is further configured to process the second e-mail message with a data comparison tool to define a block that includes the additional text.

3. The electronic communication system of claim 2, wherein the second distributed application is further configured to insert start and end markers for the block including the additional text in the certified version of the second e-mail message sent to the second client device.

4. The electronic communication system of claim 1, further comprising a blockchain API between the first client device and the first distributed application, wherein the blockchain API verifies an identity of the first user prior to transmitting the e-mail message from the first client device to the first distributed application.

5. The electronic communication system of claim 1, wherein the content of the certified version of the first e-mail message includes a block that is numbered by the first distributed application and wherein the second distributed application numbers the block including the additional text, whereby ordering of blocks in electronic communications between the first client device and the second client device is maintained.

6. The electronic communication system of claim 5, wherein the first distributed application or the second distributed application is configured to provide numbering of the blocks in the signature portion or in the modified signature portion.

7. The electronic communication system of claim 1, wherein each of the first client device and the second client device includes a plugin for the MUA and wherein the plugin communicates the first e-mail message to the first distributed application and the second e-mail message that includes the additional text to the second distributed application.

8. The electronic communication system of claim 6, wherein the plugin for the MUA blocks transmittal of e-mails to the e-mail server that are missing, respectively, the signature portion or the modified signature portion.

9. A method of certifying iterative electronic communications comprising:
- a distributed application receiving a message send request from a user device, wherein the message send request includes message content;
- identifying a new block of text in the message content;
- using a blockchain network, calculating a hash for the new block of text using a blockchain private key associated with a sender of the message send request;
- the blockchain network adding an annotation by an email author in the email thread at an end of the message content, wherein the annotation includes the hash for the new block of text; and
- the blockchain network returning a message thread including the message content and the annotation to the sender of the message send request.

10. The method of claim 9, wherein the message content comprises one or more blocks of protected content and wherein the method comprises validating each of the one or more blocks of protected content using at least one of a blockchain public key associated with an author of each of the one or more blocks of protected content, a digital signature associated with each of the one or more blocks of protected content, and a block number assigned to each of the one or more blocks of protected content.

11. The method of claim 10, wherein the digital signature is calculated over a combination of a blockchain hash of the block of protected content, the block number, and e-mail associated with an author of the one or more blocks of protected content.

12. The method of claim 9, wherein the annotation further comprises a digital signature calculated over a combination of a blockchain hash of the new block, a block number assigned to the new block, and an e-mail or identity associated with the sender of the message send request.

13. The method of claim 12, wherein the digital signature is calculated using the blockchain private key associated with the sender of the message send request.

14. The method of claim 9, further comprising adding start and end markers to the new block and assigning a block number indicating an order of the new block of protected content in the message thread.

15. A method of certifying iterative electronic communications comprising:
- receiving a message thread from a sender including message content comprising one or more blocks of protected content, wherein each block has its own hash and references an annotation that is a section of text at the end of a hash thread;
- validating each of the one or more blocks of protected content using at least one of a blockchain public key associated with an author of each of the one or more blocks of protected content, a digital signature associated with each of the one or more blocks of protected content, and a block number assigned to each of the one or more blocks of protected content;
- when validating fails, the distributed network marking the message thread to indicate the message thread is untrusted; and
- when the validating succeeds, the distributed network marking the message thread to indicate the message thread has been blockchain certified.

16. The method of claim 15, wherein the digital signature is calculated over a combination of a blockchain hash of the block of protected content, the block number, and e-mail or identifier associated with an author of the one or more blocks of protected content.

17. The method of claim 15, further comprising:
- identifying a new block of text in the message content;
- using a blockchain system, calculating a hash for the new block using a blockchain private key associated with a sender of the message send request;
- adding an annotation at an end of the message content, wherein the annotation includes the hash for the new block of protected content; and
- returning a message thread including the message content and the annotation to the sender of the message send request.

18. The method of claim 17, wherein the annotation further comprises a digital signature calculated over a combination of a blockchain hash of the new block of protected content, a block number assigned to the new block of protected content, and an e-mail or identity associated with the sender of the message send request.

19. The method of claim 18, wherein the digital signature is calculated using the blockchain private key associated with the sender of the message send request.

20. The method of claim 15, further comprising adding start and end markers to the new block of protected content and assigning a block number indicating an order of the new block in the message thread.

* * * * *